(12) United States Patent
Seisenberger et al.

(10) Patent No.: US 7,940,743 B2
(45) Date of Patent: May 10, 2011

(54) METHOD AND DEVICE FOR THE SYNCHRONIZATION OF RADIO STATIONS AND A TIME-SYNCHRONOUS RADIO BUS SYSTEM

(75) Inventors: Claus Seisenberger, Neufrannhofen (DE); Martin Vossiek, Hildesheim (DE)

(73) Assignee: Symeo GmbH, Neubiberg (DE)

( * ) Notice: Subject to any disclaimer, the term of this patent is extended or adjusted under 35 U.S.C. 154(b) by 2144 days.

(21) Appl. No.: 10/496,886

(22) PCT Filed: Nov. 19, 2002

(86) PCT No.: PCT/DE02/04263
§ 371 (c)(1),
(2), (4) Date: May 26, 2004

(87) PCT Pub. No.: WO03/047137
PCT Pub. Date: May 6, 2003

(65) Prior Publication Data
US 2005/0030935 A1 Feb. 10, 2005

(30) Foreign Application Priority Data
Nov. 26, 2001 (DE) .................................. 101 57 931

(51) Int. Cl.
H04J 3/06 (2006.01)
(52) U.S. Cl. ........................................ 370/350; 455/502
(58) Field of Classification Search .................. 370/350; 455/502
See application file for complete search history.

(56) References Cited

U.S. PATENT DOCUMENTS

| | | | |
|---|---|---|---|
| 4,506,228 A * | 3/1985 | Kammeyer | 329/343 |
| 5,228,025 A | 7/1993 | Le Floch et al. | |
| 5,436,904 A * | 7/1995 | Pequet et al. | 370/347 |
| 5,590,161 A | 12/1996 | Meyn et al. | |
| 5,654,960 A * | 8/1997 | Kohlschmidt | 370/337 |
| 5,936,961 A * | 8/1999 | Chiodini et al. | 370/441 |
| 6,084,932 A * | 7/2000 | Veintimilla | 375/355 |
| 6,728,326 B1 * | 4/2004 | Fulghum | 375/365 |
| 6,853,675 B1 * | 2/2005 | Oleynik | 375/130 |

FOREIGN PATENT DOCUMENTS

| | | |
|---|---|---|
| DE | 694 13 224 | 3/1999 |
| DE | 199 46 204 | 3/2001 |
| DE | 199 46 161 | 4/2001 |
| DE | 199 46 168 | 4/2001 |
| EP | 0 380 372 | 8/1990 |
| EP | 0 750 408 | 12/1996 |
| EP | 1 051 006 | 11/2000 |
| WO | WO 92/16063 | 9/1992 |

OTHER PUBLICATIONS

Wayne Tomasi, Fundamentals of Electonic Communications Systems, Prentice-Hall Inc., 1988, Seite 272.

* cited by examiner

Primary Examiner — Charles N Appiah
Assistant Examiner — Jaime M Holliday
(74) Attorney, Agent, or Firm — Young & Thompson

(57) ABSTRACT

A method and device for synchronizing a transmitter and a receiver with each other over a radio interface. A transmission signal is produced with a signal source in the transmitter and is transmitted via the radio interface. A corresponding receiver signal is received in the receiver from the radio interface and is evaluated using a receiver signal source signal from a signal source of the receiver adapted to the signal source of the transmitter. The same frequency modulation is applied to the receiver signal source signal, whereby the receiver signal received in the receiver is mixed with the receiver signal source signal to form a mixed signal and the mixed signal is analyzed with respect to frequency unbalance.

21 Claims, 3 Drawing Sheets

Figure 1:
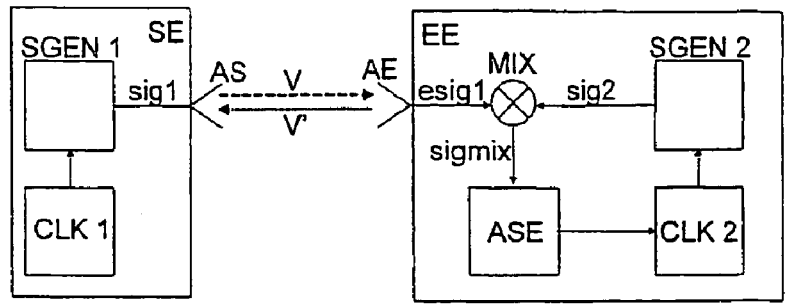

METHOD AND DEVICE FOR THE SYNCHRONIZATION OF RADIO STATIONS AND A TIME-SYNCHRONOUS RADIO BUS SYSTEM

BACKGROUND OF THE INVENTION

The invention relates to a method for synchronization of radio stations, a device or a radio bus system to execute such a method, as well as uses thereof With microwave systems it is usual to not analyze detected high-frequency signals directly but in relation to a comparison signal. Usually mixers or demodulators are used with which a detected signal is reduced with a comparison signal into a mostly lower-frequency band. It is especially advantageous if the comparison signal exhibits a time and frequency relationship to the detected signal which is as exact as possible. The more exact this relationship is, the more interference-free and the more easily the information contained in the detected signal can be deduced. If the signal of interest is sent by a transmitter station and received and analyzed in a geographically distant receiver station using the method described, this desired time and frequency relationship is not provided just like that, since both signals, that is the send signal generated in the transmitter station and the comparison signal generated in the receiver station, originate from different sources or have been derived from different sources.

It is thus of general interest to couple the sources in the transmitter and receiver station to one another in some manner. There are a variety of methods and arrangements usually employed for this purpose. A simple frequency relationship can be implemented by using oscillators with high frequency stability in the transmitter and in the receiver.

However, temperature or ageing drifts for example mean that an unknown residual frequency offset always remains here. More expensive arrangements have means which are suitable for determining the residual frequency offset and/or the phase offset. Based on the deviation values determined, the comparison source can then be controlled or adjusted, for example. A wide variety of frequency and phase regulation loops are used for this purpose. These methods are generally very expensive and susceptible to interference, especially if the source of the send source to which adjustment is to be made is not the only source of transmitter signals in the environment of the receiver station.

If a residual frequency offset exists, the phases of the two sources cannot be in a fixed relationship, in which case the phases correspond in principle to a time variable. If, for example, a time mark is sent by the transmitter station and detected by the receiver station, the two time references only match for a short time and then, depending on the residual frequency offset, diverge from each other more or less quickly since the timing of the "clocks" does not run at precisely the same speed. Furthermore it is only possible with difficulty to transmit very exact time marks since the steepness of the signal edges cannot be at just any angle since the allowed bandwidth for radio systems is subject to statutory restrictions.

Thus the following problems frequently occur with radio systems:

With radio systems operating in time division multiplexing mode a transmitter station sends a signal to a receiver station which for its part responds to this signal after an agreed time interval. If the "clock" in the receiver station is not running exactly synchronously with the "clock" in the transmitter station, the time at which the transmitter station responds is never known exactly. This prevents the distance between the transmitter station and the receiver station being able to be determined on the basis of the delay time of the signals transmitted for example. It also makes it difficult, especially with systems operating over a very wide bandwidth, to demodulate or extract information from the receive signals.

With time-synchronous complex radio bus systems the functions partly involve transmission of one or more items of information from a master station to different slave receiver stations. If this information includes handling, instructions for example, then with a few applications it is desirable for these instructed actions to execute time-synchronously, e.g. if a number of processing units for which the execution sequences are very critically coupled with regard to timing. For the reasons given above such time synchronism is generally not provided by radio bus systems. On the one hand, the instructions to the individual slave receiver stations are mostly sent sequentially and, on the other hand, the instructed actions often take a relatively long time. That is, the "clocks" in all radio stations must be synchronized very exactly to be able to operate these types of application. A synchronization with the normal DCF-77 radio clock, for example, is frequently much too imprecise and GPS-based clocks (GPS: Global Positioning System) are frequently too expensive and also still too imprecise in some cases.

SUMMARY OF THE INVENTION

The object of the invention is to propose a method and a device which makes possible improved synchronization of two radio stations which communicate with each other via a radio connection.

Usefully, for a method for synchronization of a transmitter station and a receiver station which communicate with each other via a radio interface in radio or line-based communication system, where in the transmitter station a transmitter signal with a transmitter signal source is generated and is transmitted over the radio interface and in the receiver station a corresponding receiver signal is received from the radio interface and is evaluated using a receiver signal source signal of a receiver-side signal source matched to the transmitter-side signal source, for current matching of the synchronization both to the transmitter signal and also to the receive signal source signal a similar frequency modulation is applied, where the receive signal received in the receiver station is mixed with the receiver signal source signal into a mixed signal and the mixed signal is analyzed with regard to a frequency unbalance.

Frequency modulations can especially be in the form of a linear of sectionally linear ramp with continually rising and/or falling frequency. Any other modulations can also be used instead of a ramp.

Taking into account a proportionality value, which can be set equal to one in simple cases, a constant frequency difference value and a time offset of the signal can as a rule be determined in relation to each other. A simple system of equations can be used to provide a solution.

Such a method can be executed in appropriate receiver equipment or in combined transmitter/receiver equipment which for modulation use parameters which are also used in this form in the transmitter equipment for signal generation. Especially with methods where the modulation is matched to the instantaneous requirements, the transmitter stations are also to be equipped in such a way that for transmitter signal creation, different modulation parameters are used consecutively generally or on request by the receiver station using them to communicate.

A time-synchronized bus system with at least one master station and a plurality of communication units communicating with it can be used in many technical areas, for example to control technical systems with a central master station and a plurality of workstations which are controlled by the central master station.

Figure 2:
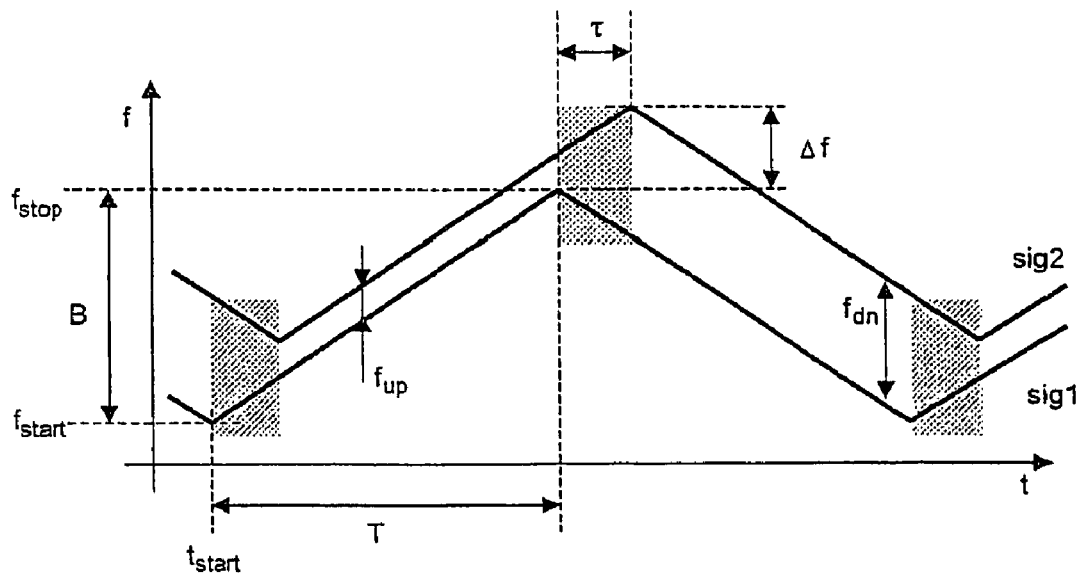
Figure 3:
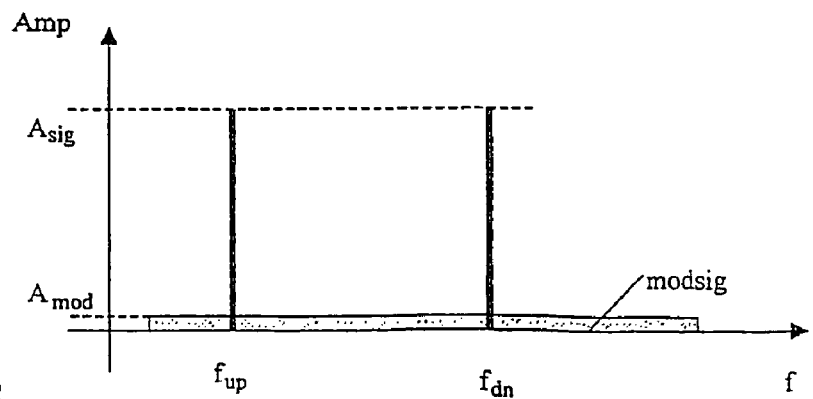
Figure 4:
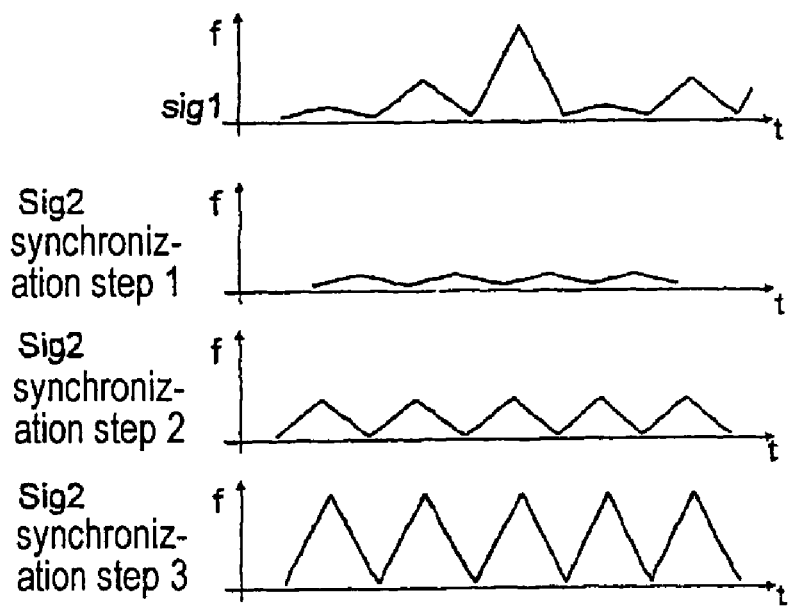
Figure 5:
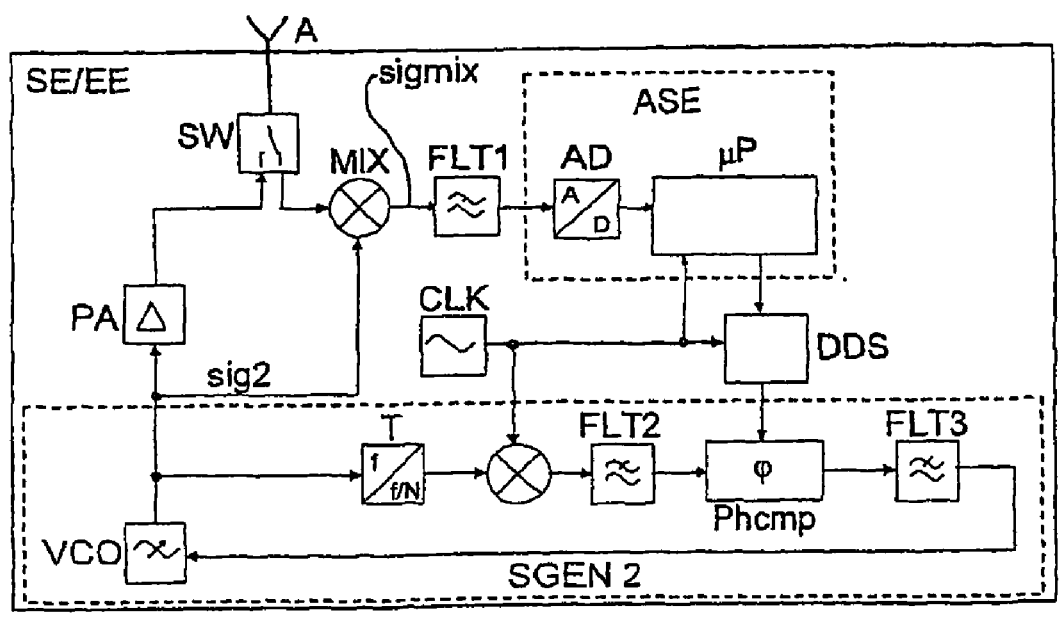
Figure 6:
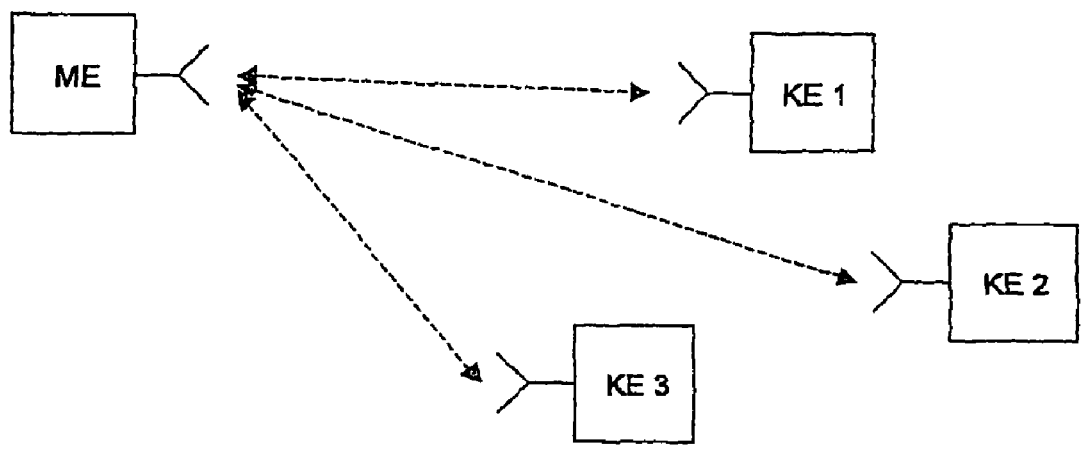
Figure 7:
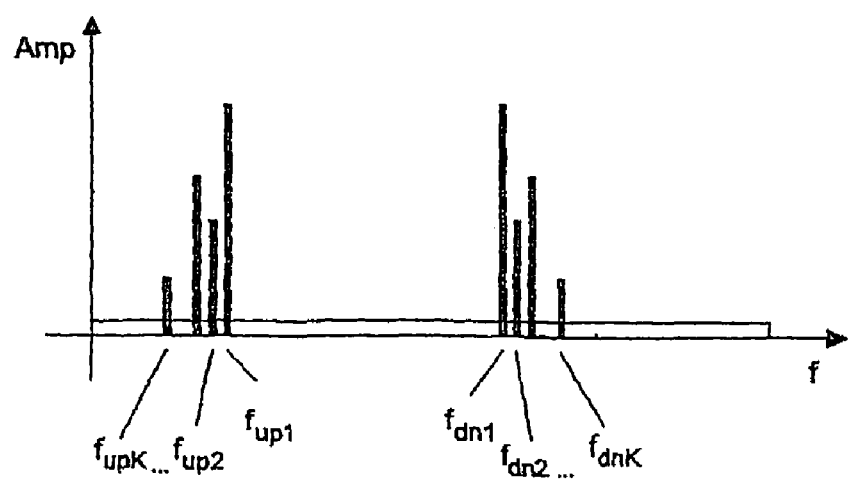

An exemplary embodiment is explained below in more detail on the basis of the drawings that show:

FIG. 1, two radio stations communicating with one another;

FIG. 2, two signal forms, as created by a first signal generator in a transmitter device or a second signal generator in a receiver device;

FIG. 3, the spectrum of a frequency-modulated signal;

FIG. 4, signals with different frequency curves;

FIG. 5, an embodiment of a preferred transmitter/receiver device;

FIG. 6, a master station which communicates with a number of communication units; and FIG. 7, different amplitude spectrums of frequency components.

DESCRIPTION OF PREFERRED EMBODIMENTS

As can be seen from FIG. 1, a transmitter station SE consists of various units of which, in order to simplify matters, only those which are relevant are described below. These are, in particular, a signal generator SGEN 1 to generate a transmitter signal sig1 as well as a clock device CLK 1 to generate a clock to trigger the signal generator SGEN 1.

The transmitter station SE uses the signal generator SGEN 1 to generate the transmitter signal sig1 which is radiated via a transmit antenna AS via a radio interface V in the direction of the receiver station EE. The form of the signal sig1 is fixed, for example a triangular frequency-modulated ramp, as shown in FIG. 2. Only frequency f and duration $\Delta T$ of the signal sig1 are scaled using a basic clock which is created in the clock device CLK1 of transmitter station SE and has the duration 2T.

The receiver station EE is largely made up of the same units. In this station a signal sig2 is generated in the same way as in the transmitter station SE. A signal generator SGEN 2 is again used for signal generation which is triggered with the aid of a clock of a clock device CLK 2. The form of the signal sig2 should correspond to the form of the signal sig1. The scaling factor of signal sig2 which is determined by the clock device CLK2 is however in the general case, i.e. in the unsynchronized case, initially different from the signal sig1 of transmitter station SE. Also, there is generally initially a time and a frequency offset between these signals sig1 and sig2.

The signal received via the antenna AE of the receiver station EE which was previously generated and transmitted by the transmitter station SE is mixed in a mixer MIX with the signal sig2. The mixed signal sigmix is fed to an analysis and control unit ASE which analyzes the mixed signal and, based on the analysis result, modifies the clock of the clock unit CLK2 in such a way that the transmitter station SE and the receiver station EE run as synchronously as possible The method for synchronization is described in greater detail below for an especially advantageous signal form. A triangular frequency-modulated ramp, as shown in FIG. 2, is preferably used as the signal form. Starting from a start frequency $f_{start}$, the frequency f of the sine-wave transmitter signal sig1 is increased linearly directly or also linearly sectionally in time T initially to a stop frequency $f_{stop}$ and then reduced again in the same manner to the start frequency $f_{start}$.

This modulation is preferably repeated cyclically. In this case the exact values of the start frequency $f_{start}$, of the stop frequency $f_{stop}$ and of the time T of the clock unit CLK1 are interdependent and therefore unknown in the frame in which the basic clock unit CLK1 can vary. The signal sig2 of the receiver station EE is generated in the same way. Depending on the clock unit CLK2 of the receiver station EE the signal sig2 of the receiver station EE differs as regards the start frequency $f_{start}$, the stop frequency $f_{stop}$ and the time T from the transmitter signal sig1 and there is initially a random time offset between signals sig1 and sig2.

If it is initially assumed that the signal frequencies used in the system are much larger than the modulation bandwidth B of the signals sig1 and sig2 used for synchronization and that the basic clocks of the two clock units CLK1 and CLK2 are about the same value, it is possible to describe the difference between the signal sig1 of the transmitter station SE and the signal sig2 of receiver station EE sufficiently accurately by a frequency offset $\Delta f$ and a time offset $\tau$. The mostly slightly different increase of the ramps can be ignored for the given conditions, which are generally to be found in usual practical embodiments of radio systems. In the mixer MIX, which usually has a lowpass filter connected downstream from it which eliminates the high-frequency mix components, as is generally known per se, frequency difference $\Delta f$ between the two signals sig1 and sig2 is determined.

The following mixed frequencies are produced:

1) an almost monofrequent signal with a frequency $f_{up}$, if both the transmitter signal sig1 and also the receiver signal sig2 are located in the rising part of the ramp,
2) an almost monofrequent signal with a frequency $f_{dn}$, if both the transmitter signal sig2 and also the receiver signal sig2 are located in the falling part of the ramp, and,
3) a heavily frequency-modulated signal modsig if the ramps of the two signals sig1 and sig2 have a reversed sign, identified in FIG. 2 as a shaded area.

If a spectral analysis of the mixed signals is now conducted, preferably over time 2T of a complete triangular ramp of the receiver signal sig2, the spectrum shown in FIG. 3 is produced. The amplitudes of the monofrequent signal parts $A_{sig}$ increase as the time offset ti between the signals sig1 and sig2 decreases. The amplitude of the broadband signal modsig is in general far smaller than the monofrequent signal components $A_{sig}$ except in the special case in which the signals sig1 and sig2 are offset relative exactly by T, since the signal energy is distributed over a large bandwidth. From this spectrum the two frequencies $f_{up}$ and $f_{dn}$ of the monofrequent signals are to be determined. If these are known, the receiver station EE can be synchronized very precisely with the transmitter station SE.

The method is only applicable to the signal form shown in FIG. 2. If ramp-shaped signals are used it is merely necessary to employ two ramp branches with different inclinations in order to arrive at two different frequency values with which the frequency offset $\Delta f$ and the time offset $T_{off}$ can then be calculated. To explain the principle of synchronization an example of a more general case is now examined.

It is assumed that, as shown, two linear frequency-modulated signals, known as sweeps are mixed with each other. Assuming the modulation bandwidth B of the signals is far lower than their mid frequency. The signal components for the duplicated basic frequency are, as is usual with such mixer arrangements, suppressed in a lowpass filter. The sweep rates, i.e. changes in the frequency over time of the two signals sig1 and sig2 differ by a proportionality value a, and the start frequencies of the two sweeps deviate from each other by a constant value $\Delta f$. In addition the signals have a time offset $T_{off}$ from each other. It can be shown that in this case the instantaneous frequency $f_{sigmix}(t)$ of this signal sigmix mixed in the receiver station EE which is to be analyzed in the analysis and control unit ASE, is produced as follows $$f_{sigmix}(t) = \alpha \cdot \mu t + \Delta f + \alpha \cdot \mu \cdot (t - T_{off}) - 2 \cdot \mu \cdot t + \mu \cdot \tau,$$

where g represents the sweep rate and i the delay time of the signal of the transmitter station SE to the receiver station EE. If $f_{sigmix}(t)$ is now measured in turn for two different sweep rates $\mu 1$ and $\mu 2$ and assuming that the values which are initially unknown in the unsynchronized case $\Delta f$, $T_{off}$ and a do not change or at least only change a little between the two measurements, this produces a normal equation system with the following solutions for $\Delta f$ and $T_{off}$:

$$\Delta f = \frac{f_{b2}(t) \cdot \mu_1 - f_{b1}(t) \cdot \mu_2}{\mu_1 - \mu_2} \text{ or}$$

$$T_{off} = \frac{(f_{b2}(t) - f_{b1}(t)) + 2 \cdot t \cdot \alpha \cdot (\mu_1 - \mu_2) - 2 \cdot t \cdot (\mu_1 - \mu_2) + \tau \cdot (\mu_1 - \mu_2)}{\alpha \cdot (\mu_1 - \mu_2)}.$$

Depending on the relevant system topology and the interrelationships or possible simplifications thus produced, these two equations can generally be used to very simply produce a highly-accurate synchronization of the two radio stations. A few typical options for synchronization are illustrated below.

To determine the frequency offset $\Delta f$ it is sufficient, if the factor or quotient k between the two different sweep rates, i.e. $k=\mu 1/\mu 2$, is known In this case the frequency offset $\Delta f$ is also produced without the exact sweep rate having to be known $$\Delta f = \frac{f_{b1}(t) - k \cdot f_{b2}(t)}{1 - k}.$$

If e.g. $\mu 1 = -\mu 2$ i.e. $k=-1$ is selected, which is technically very easy to implement, this produces $$\Delta f = \frac{f_{b1}(t) + f_{b2}(t)}{2}.$$

To determine the time offset $T_{off}$ it is necessary to make assumptions relating to the proportionality factor $\alpha$. It Is frequently possible to assume that the proportionality factor is simplified as $\alpha=1$ and to assume that the sweep rates $\mu 1$ and $\mu 2$ are known. Since the mid-frequency of usual radio systems is in general much greater than the modulation bandwidth B relative inaccuracies have a far greater effect on the size $\Delta f$ than on the deviation of the sweep rates. For the time offset $T_{off}$ the result with these assumptions is as follows $$T_{off} = \frac{f_{b2}(t) - f_{b1}(t)}{\mu_1 - \mu_2} + \tau.$$

Consequently the time offset $T_{off}$ is known except for the signal delay time $\tau$ and the two radio stations SE and EE can thus be synchronized with reference to time t.

If the simplified assumption $\alpha=1$ is not allowed the following system topology and analysis is suggested. If the signal of one station, that is both the mid-frequency and also the modulation are derived from a common reference frequency source, as shown later in FIG. 5 for example, that is by mixing, multiplying or with the aid of phase/frequency regulation loops, the proportionality factor $\alpha$ is always in an arithmetical relationship to the frequency offset $\Delta f$. Thus if the frequency offset $\Delta f$ is initially determined as described above, the proportionality factor $\alpha$ and consequently thereafter also the time offset $T_{off}$ can be uniquely derived.

If the receiver signal sig2 or the clock unit CLK2 is corrected with the derived relationships with the corresponding values $\Delta f$ and $T_{off}$ the transmitter station SE and the receiver station EE are running synchronously, i.e. both the signals sig1 and sig2 are almost identical and the clock signals in CLK1 and CLK2 are almost exactly the same. Consequently synchronization is retained over longer periods.

If one considers the two radio stations SE and EE clearly as clocks, the key clocks are running at the same speed after a successful synchronization except for a signal delay time T also absolutely exactly the same.

In the synchronized case the mixed frequency $f_{sigmix}(t)$ is no longer a function of the time but is constant. If the proportionality factor $\alpha$ only deviates slightly from 1 a time dependency of $f_{sigmix}$ can also be ignored in the unsynchronized case which makes analysis considerably simpler since then the mixed signal $f_{sigmix}$ can be determined with the usual spectral analysis methods, such as Fourier transformation averaged over the entire measurement duration and does not have to be derived from the instantaneous frequency, i.e. the derivation of the signal phase.

The explanations below again assume the signal forms as shown in FIG. 2. The embodiments are however also naturally transferable to the general case. In the embodiment of the system the following improvements of the synchronization procedure are advantageous. As has been shown above, it can be that the signals sig1 and sig2 are offset relatively precisely by the time T and thus the two frequencies $f_{up}$ and $f_{dn}$ cannot be detected or cannot be uniquely detected. Preferably this special case is handled in such a way that the receiver signal sig2 is then offset by preferably half the time T/2 and a new measurement is started if in the spectrum the two frequencies $f_{up}$ and $f_{dn}$ cannot be uniquely detected.

To keep the frequency range required for detection of the mixed signal sigmix in the analysis and control device ASE small and allow previously ignored differences in ramp steepness in the non-synchronized case to be handled, the synchronization is preferably undertaken adaptively in a number of steps. To do this the units shown in FIG. 1 are preferably expanded by a radio communication link V' from the receiver station EE to the transmitter station SE. This radio communication link V' can be implemented using any type of prior art and is thus not explained in any greater detail here. The only important factor is that the receiver station EE can send messages to the transmitter station SE to control the execution of synchronization. Preferably synchronization is started precisely as described above, but with a much reduced modulation bandwidth B. Also for initially greater time offset values $\tau$ the two frequencies $f_{up}$ and $f_{dn}$ are not nearly as large as they would be if the full modulation bandwidth had been selected. However the synchronization is also to be executed only correspondingly less accurately. Based on these values of the frequencies $f_{up}$ and $f_{dn}$ a first rough synchronization is thus initially executed. As soon as this first synchronization is completed the receiver station EE notifies the transmitter station SE about this over the radio interface V. In the transmitter station SE and the receiver station EE the modulation bandwidth B is then increased and a more exact synchronization is performed. Since before this second step a first synchronization has already taken place, even with an increased bandwidth in the second step no high frequencies $f_{up}$ and $f_{dn}$ are to be expected. The said steps are then repeated with a further increase in the bandwidth up to the full modulation bandwidth B. Usually a few steps, e.g. 1/100 bandwidth, 1/10 bandwidth and full bandwidth are sufficient for a secure and exact synchronization.

If you wish to dispense with the additional radio communication link V, the step-by-step synchronization can also be implemented as follows. The transmitter station SE repeatedly transmits a number of triangular ramps with different bandwidths, preferably directly after one another, e.g. N ramps. For N=3 this would for example produce 1/100 bandwidth, 1/10 bandwidth and full bandwidth, 1/100 bandwidth, 1/10 bandwidth etc. At the beginning of synchronization, as can also be seen from FIG. 4, the ramp signal with the lowest bandwidth is selected for the receiver signal sig2 and this is repeated at least N times. Frequency analysis is also preferably performed over a period of 2NT. The frequencies shown above of $f_{up}$ and $f_{dn}$ are then produced by one of the N ramp pairs. Once this first synchronization has been completed, the ramp signal with the next higher bandwidth is used in the same way for receiver signal sig2 etc., until the N ramps of this signal sig2 have reached the full bandwidth.

Alternatively a first synchronization of the mid frequencies could also be undertaken with an unmodulated CW (Continuous Wave) signal and the time offset $T_{off}$ corrected in one or more steps thereafter, as described above.

The mixer Mix can be embodied both as a real-value mixer and also as a quadrature mixer which creates the real and imaginary part of the mixed signal sigmix. If the mixed signal sigmix is measured as real values, the negative frequencies in the spectrum, as is generally known, are folded into the positive frequency range mirrored around the zero point. If a real-value mixed signal sigmix is used it can be useful to select for the mixed signal sigmix a specific intermediate frequency $f_{zf}$ which differs from zero, i.e. to select the mixed signal sig2 so that the frequency offset $\Delta f$ is also not zero after complete synchronization but corresponds to the intermediate frequency $f_{zf}$.

The analysis and control device ASE preferably includes, as can also be seen from the example in FIG. 5, an analog/digital converter AD, a memory for digital recording of the mixed signal sigmix and a processor μP for spectral analysis and for control of clock unit CLK2 or for generation and control of the signal sig2 of receiver station EE.

The signal generators are preferably embodied using a frequency synthesizer with phase-locked loop, a digital signal generator or a DDS (Direct Digital Synthesis) chip. The frequency synthesizer can be embodied using any prior art, e.g. with programmable fractional or integer dividers or with a DDS chip whether the signals are adapted as shown via the clock units CLK1 and CLK2 or using other means, e.g. directly via a frequency synthesizer or a DDS arrangement or whether the signal pattern of the signal generator is newly calculated, is naturally not decisive for the function of the method provided the resulting signals sig1 and sig2 and their descriptive adaptation correspond to the above embodiments or can be related back to them.

Usually the signal forms are generated in a low-frequency baseband and then mixed into higher frequencies with the aid of a fixed frequency oscillator e.g. in the microwave range. Generally the method is naturally not determined for a specific frequency range or for a specific wave type but for example applicable to acoustic sources, electromagnetic sources. The only important aspect is the modulation capabilities of the source and the opportunity of mixing signals sig1 and sig2. The mixing process, e.g. a multiplication, can naturally also be performed for suitable frequencies arithmetically in a computing device.

FIG. 5 shows a possible embodiment. The system is embodied here so that the station can function as both a transmitter and also as a receiver station.

Essentially this combined station consists of an antenna A for transmitting and receiving signals sig1 or sig2. A switch SW is connected to the antenna which switches over between a receiving mode and a transmitting mode and couples the antenna A to corresponding modules. The output of the switch SW for received signals sig1 is connected to a mixer MIX. An second input of the mixer MIX is connected to the signal source VCO as described below. The output of the mixer MIX via which the mixed signal sigmix is output is connected to a filter FLT1, the output of which the leads to the actual analysis and control device ASE. This consists especially of an analog/digital converter AD and a microprocessor μP. The output of the microprocessor μP is connected to a DDS chip DDS or a corresponding arrangement. The microprocessor μP and the DDS chip DDS each feature a further input for feeding in a clock signal from a clock generator CLK. The output of the DDS chip DDS is connected, provided it is not embodied as a component of the latter, to a signal generator SGEN2(2). The signal generator SGEN2(2) consists of a plurality of components, especially the signal source VCO, of which the output leads to the mixer MIX, a power amplifier PA and a frequency divider T, the frequency divider T to divide the signal frequency f of the signal sig2 into a integer fraction f/N, a further mixer MIX2, whose inputs are connected to the clock source CLK and the frequency divider T, a second filter FLT2, of which the input is connected to the further mixer MIX2, a phase comparator Phcmp φ, of which the inputs are connected to the second filter FLT2 and the DDS chip DDS, and a filter FLT3 of which the inputs are connected to the output of the phase comparator Phcmp and of which the output is connected to the signal source VCO.

Switch SW selects whether the signal generated by the VCO (Voltage Controlled oscillator) is transmitted via the power amplifier PA or whether the signal received via the antenna A is mixed in mixer MIX with the signal generated in the signal source VCO. Generally it is advantageous, especially in relation to signal generation, if systems of the same type are used in the transmitter and the receiver station. Signals are generated in the exemplary embodiment shown using a DDS frequency synthesizer. The frequency of the clock source or of the fixed frequency oscillator CLK serves as a basic clock. All signals, frequencies and timing variables for the system, i.e. the processor uP and the DDS chip DDS, are derived from this basic clock. The DDS chip DDS, the phase comparator Phcmp, the second and third filter FLT2 and FLT3, the signal source VCO, the further mixer MIX2 and the frequency divider T in themselves make up a frequency synthesizer in accordance with the prior art. The frequency synthesizer could naturally also be implemented using another type of prior art Thus for example the DDS chip DDS could be replaced by a divider programmable by a processor uP or a digital function generator, also a memory with stored signal curve and D/A converter, or a frequency synthesizer with fractional PLL (Phase Lock Loop) or the mixer MIX2 omitted for example.

If for the system in accordance with FIG. 5 the VCO frequency of the signal source or transmitter station VCO is increased with the aid of the DDS chip DDS starting at the start frequency $f_{start}$ in time T by bandwidth B and determined for a corresponding first measurement of the frequency $f_{up}$ and in a further measurement with an opposite sweep direction, also starting from $f_{start}+B$ determined down to $f_{start}$, the frequency $f_{dn}$, based on the frequencies determined $f_{up}$ and $f_{dn}$ the following solutions for the frequency offset Δf and the time offset $T_{off}$ can be derived from the dependencies shown above:

$$\Delta f = \frac{f_{up} + f_{dn}}{2}$$

and $$T_{off} = \frac{T}{B} \cdot \frac{f_{dn} \cdot B + f_{dn} \cdot f_{Start} - f_{up} \cdot f_{Start}}{2 \cdot (f_{Start} + B/2 - f_{up} - f_{dn})}.$$

The frequencies $f_{up}$ and $f_{dn}$ are determined in the exemplary embodiment after A/D conversion of the mixed signal sigmix in the processor up with the aid of Fast Fourier Transformation (FFT) or another known method of spectral analysis.

The method can be applied very advantageously for time-synchronous bus systems. A communication system is accordance with any given prior art is expanded here by the embodiment described. After successful synchronization it is then possible for example to transmit instructions or sequences of instructions with time marks by radio and process the instructions or sequences of instructions highly accurately, e.g. in the microsecond range or even in the nanosecond range in accordance with the instructed time scheme. This can be necessary in particular when, as shown in FIG. 6, a number of communication devices KE are instructed by a master station ME, such as with a machine tool for which a number of workstations are accessed by radio for example for which the working sequences are coupled very critically to each other. All communication devices are then synchronized with the master device using the method in accordance with the invention.

In an especially advantageous embodiment synchronization with the method described can also be completed in such as way that a precise channel length measurement, that is the distance between two communication devices, can be undertaken for example using a "Challenge-Response-Method" in time-division multiplexing. After synchronization in accordance with the method is completed a first station KE 1 or ME transmits a signal to a second station KE 2 which in its turn sends back a response signal after an agreed time span. From the time difference between request and response, taking into account the agreed time span, the signal delay time and thus the radio channel length can be calculated. With usual systems without synchronization in accordance with the method, this method fails as a rule because of the fact that two geographically-separate systems cannot agree any exact length of time, especially no long period, since their clock bases are not identical. However synchronization enables highly-accurate reconciliation of the clocks to be undertaken.

As a further method for distance measurement between a base-station and a transponder the reader is also referred to DE 199 46 161, DE 199 46 204 and DE 199 46 168. These especially describe embodiments for distance measurement with active microwave reflectors or for determining the position of objects in which there is a delayed response to an inquiry signal. These methods can be combined very advantageously with the method described here. Since the linear frequency-modulated signals which are used in the embodiment for synchronization correspond to the signals which are usually used for FMCW (FMCW: Frequency Modulated Continuous Wave) radar systems, all known FMCW distance measurement methods can be usefully employed with the system in accordance with the method and the synchronization method.

If the distances between the master station ME and a number of communication devices KE 1, KE 2, KE 3 are known for example with the aid of the method previously illustrated, time synchronization can be improved even further by taking account of the signal delay times as well. In this case it is possible to synchronize a number of distributed radio stations KE 1, KE 2, KE 3, which are also far way from each other and at different distances to each other highly accurately, i.e. better than the signal delay time differences between the radio stations.

Very advantageously the system in accordance with the invention can also be used for calibrating and characterizing radio channels. The system is especially suitable for detection and evaluation of multiple reflections. If multiple reflections occur, i.e. the signal sent out by the transmitter station reaches the receiver station not just via one route but by a number of routes of different lengths, the spectrum shown in FIG. 2 changes in the way shown in FIG. 7. As well as the frequencies of the shortest transmission path $f_{up1}$ and $f_{dn1}$ additional spectral lines ($f_{up2}, f_{dn2}, \ldots, f_{upK}, f_{dnK}$) of longer transmission paths occur, depending on the number K of transmission paths. With a known ramp rise it is a very simple matter to calculate from the frequency differences between the lines the signal delay differences or the differences in length between the transmission paths. In addition each transmission channel is also to be assigned a precise transmission loss. Consequently the entire transmission is to be analyzed in very great detail. Based on such an analysis in accordance with the method it would be possible, to improve communication systems, to adapt the coding scheme of data transmission or the data rate of the communication system depending on the situation to the relevant channel characteristics. This enables improved transmission security and an increased effective data rate to be guaranteed. It can also be executed to take account of the measured channel characteristics for the evaluation of the data stream e.g. with the aid of folding back, which compensates for the differing lengths and losses of the transmission paths.

The synchronization signals shown have very good auto-correction and cross-correlation characteristics, so that its is also possible to transmit a bit data stream in parallel, that is at the same time as the synchronization signals. The correlation characteristics of the synchronization signals also have the effect of making the system and method in accordance with the invention generally very robust as regards interference from other radio systems.

The invention claimed is:

1. A method for synchronization of a transmitter station (SE;SE/EE) and a receiver station (EE;SE/EE) which communicate with each other over an interface (V), the method comprising the steps of:
    in the transmitter station (SE;SE/EE), generating a transmitter signal (sig1) with a signal source (SGEN1) and transmitting the transmitter signal over the interface (V), the transmitter signal (sig1) having a first frequency modulation form;
    in the receiver station (EE;SE/EE), receiving a receiver signal (esig1) corresponding to the transmitted transmitter signal (esig1) on the interface (V) for evaluating the receiver signal using a receiver signal source signal (sig2) from a receiver-side signal source (SGEN2) matched to the transmitter-side signal source (SGEN1), the receiver signal source signal (sig2) being triggered by a clock of a clock unit (CLK2) of the receiver station,
    the receiver signal source signal (sig2) and the transmitter signal (sig1) being of the same first frequency modulation form;

mixing the receiver signal (esig1) received in the receiver station with the receiver signal source signal (sig2) to form a mixed signal (sigmix); analyzing the mixed signal (sigmix) to determine an adjustment to the clock of the receiver station, the determination based on an analysis of the mixed signal; and adjusting the clock of the clock unit of the receiver station to synchronize the receiver signal source signal (sig2) with the receiver signal (esig1).

2. The method in accordance with claim 1, in which a frequency modulation is applied to the transmitter signal (sig1) and to the receiver signal source signal (sig2) and the spectrum of the mixed signal (sigmix) is analyzed.

3. The method in accordance with claim 2, in which the modulation is undertaken linearly in sections on the transmitter signal (sig1) and on the receiver signal source signal (sig2).

4. The method in accordance with claim 1, in which a frequency modulation is applied to the transmitter signal (sig1) and to the receiver signal source signal (sig2) for which the modulation bandwidth (B) is an order or magnitude smaller than its signal mid frequency.

5. The method in accordance with claim 1, in which after mixing in a proportion of the receiver signal (esig1) and a proportion of the receiver signal source signals (sig2), changes of the frequency per time (t) of these two signals to each other differ by a proportionality value ($\alpha$) and the modulation start frequencies of the proportions of the receiver signal (sig1) and of the receiver signal source signal (sig2) deviate from one another by a constant frequency difference value $\Delta f$, the mixed signal proportions as a rule show a time offset ($T_{off}$) to each other.

6. The method in accordance with claim 1, wherein said step of analyzing the mixed signal (sigmix) creates an equation system from parameters from two mixed signals ($f_{sigmix}$(t)), the receiver signal (esig1) and the receiver signal source signal (sig2), are measured consecutively with two different modulation rates ($\mu 1$ or $\mu 2$).

7. The method in accordance with claim 6, in which with two measurements with different modulation rates as parameters two different frequencies (fb1 and fb2) are used and it is assumed that in an unsynchronized case the initially unknown variables of the frequency difference value ($\Delta f$), of the time offset ($T_{off}$) and of a proportionality value ($\alpha$) between the receiver signal (esig1) and the receiver signal source signal (sig2) does not change or at least only changes slightly between the two measurements, especially the equation system for the frequency difference value ($\Delta f$) and the time offset ($T_{off}$) is resolved in accordance with at least one of, $$\Delta f = \frac{f_{b2}(t)\cdot\mu_1 - f_{b1}(t)\cdot\mu_2}{\mu_1 - \mu_2} \text{ and}$$

$$T_{off} = \frac{(f_{b2}(t)-f_{b1}(t))+2\cdot t\cdot\alpha\cdot(\mu_1-\mu_2)-2\cdot t\cdot(\mu_1-\mu_2)+\tau\cdot(\mu_1-\mu_2)}{\alpha\cdot(\mu_1-\mu_2)}.$$

8. The method in accordance with claim 1, in which for frequency synchronization, a frequency difference ($\Delta f$) between the receiver signal (esig1) and the receiver signal source signal (sig2) with known factors (k=$\mu 1/\mu 2$) between two different modulation rates ($\mu 1$ and $\mu 2$) without knowledge of the exact modulation rates ($\mu 1$ or $\mu 2$) is determined, from $$\Delta f = \frac{f_{b1}(t)-k\cdot f_{b2}(t)}{1-k}.$$

9. The method in accordance with claim 1, in which for timing synchronization a time offset ($T_{off}$) between the receiver signal (esig1) and the receiver signal source signal (sig2) is determined, considering a signal delay time ($\tau$), on the assumption regarding a proportionality factor ($\alpha$) that at a mid frequency much larger than a modulation bandwidth (B) relative inaccuracies affect a frequency value ($\Delta f$) much more greatly than are used on the deviation of different modulation rates:

$$T_{off} = \frac{f_{b2}(t)-f_{b1}(t)}{\mu_1-\mu_2}+\tau.$$

10. The method in accordance with claim 1, wherein said step of analyzing the mixed signal (sigmix) includes a timing synchronization analysis where a time offset ($T_{off}$) between the receiver signal (esig1) and the receiver signal source signal (sig2) is determined using a mid frequency and a modulation from a common reference frequency source with a proportionality factor ($\alpha$) being an arithmetic ratio to a frequency difference ($\Delta f$) between the mixed signals (sig1, sig2).

11. The method in accordance with claim 1, in which all signals generated in the transmitter station (SE;SE/EE) are related in a fixed way to a transmitter-side reference source (CLK1) and all the signals generated in the receiver station (EE;SE/EE) are related in a fixed way to a receiver-side reference source (CLK2).

12. The method in accordance with claim 1, in which for the synchronization the receiver signal source signal (sig2) or the clock unit (CLK2) is synchronized to the receiver signal (esig1) or to a clock unit (CLK1) of the transmitter station.

13. The method in accordance with claim 1, in which for synchronization, a receiver signal source signal (sig2) is offset by half the duration of a modulation period (T/2) and a new measurement is started if in the spectrum of the mixed signal (sigmix) two frequency components ($f_{up}$ and $f_{dn}$) are not to be sufficiently uniquely detected for evaluation.

14. The method in accordance with claim 1, in which for the synchronization the receiver signal source signal (sig2) and/or the transmitter signal source signal (sig1) are modified adaptively in a number of steps by changing the modulation used.

15. The method in accordance with claim 14, in which synchronization is started in a first step with a far smaller modulation bandwidth B and in further steps in the transmitter station SE and in the receiver station EE the modulation bandwidth B is increased step-by-step and a more exact synchronization is performed.

16. The method in accordance with claim 1, in which a signal source (VCO) is tuned upwards, starting at a start frequency ($f_{start}$) in the duration of a modulation period (T) by a prespecified bandwidth (B) to an end frequency ($f_{stop}$=$f_{start}$+B) and with a first measurement a first frequency ($f_{up}$) is determined and in a further measurement with a reversed direction of modulation, starting from the end frequency ($f_{stop}$=$f_{start}$+B) down to the start frequency (fstart) a second frequency ($f_{dn}$) is determined, especially based on the frequencies determined ($f_{up}$, $f_{dn}$) solutions for a frequency offset ($\Delta f$) and a time offset ($T_{off}$) are determined by means of:

$$\Delta f = \frac{f_{up}+f_{dn}}{2} \text{ and } T_{off} = \frac{T}{B}\cdot\frac{f_{dn}\cdot B + f_{dn}\cdot f_{Start} - f_{up}\cdot f_{Start}}{2\cdot(f_{Start}+B/2-f_{up}-f_{dn})}.$$

17. The method in accordance with claim 1, wherein the receiver signal source signal (sig2) and transmitter signal (sig1) are of the same first frequency modulation form by the receiver signal source signal (sig2) and the transmitter signal (sig1) being identical except for a constant frequency difference value, a time offset, and a proportionality value in the modulation rate caused by the constant frequency difference value.

18. A receiver station comprising:
an interface input (A) to receive a receiver signal (esig1) from a transmitter-side signal source (SGEN1);
a receiver-side signal source (SGEN2) to generate a receiver signal source signal (sig2);
a processing unit (MIX, ASE) to process the receiver signal (esig1) taking account of the receiver signal source signal (sig2);
a synchronization unit (MIX, ASE, CLK2, SGEN2) to synchronize the receiver signal source signal (sig2) to the transmitter-side signal source (CLK1, SGEN1); and
a modulation unit to generate the receiver signal source signal (sig2) with a frequency modulation equivalent to a frequency modulation, as was originally applied to the transmitter signal (sig1).

19. The receiver station in accordance with claim 18, in which the synchronization unit (MIX, ASE, CLK2, SGEN2) comprises:
a mixer (MIX) for mixing the receiver signal (esig1) with the receiver signal source signal (sig2) to a mixed signal (sigmix); and
an analysis and control device (ASE) for analyzing the mixed signal (sigmix) as regards frequency tuning (sf) and/or a time offset (Tuff) and for corresponding synchronization of the receive-side signal source (SGEN2) to the send-side signal source (SGEN1).

20. A method for synchronization of a transmitter station and a receiver station which communicate with each other over an interface, the method comprising the steps of:
in the transmitter station, generating a transmitter signal (sig1) with a signal source (SGEN1) and transmitting the transmitter signal over the interface (V), the transmitter signal (sig1) having a first frequency modulation form;
in the receiver station, receiving a receiver signal (esig1) corresponding to the transmitted transmitter signal (esig1) for evaluating the receiver signal using a receiver signal source signal (sig2) from a receiver-side signal source (SGEN2) matched to the transmitter-side signal source (SGEN1),
the receiver signal source signal (sig2) being triggered by a clock of a clock unit (CLK2) of the receiver station,
the receiver signal source signal (sig2) and the transmitter signal (sig1) being identical except for a constant frequency difference value, a time offset, and a proportionality value in the modulation rate caused by the constant frequency difference value;
mixing the receiver signal (esig1) received in the receiver station with the receiver signal source signal (sig2) to form a mixed signal (sigmix); and
analyzing the mixed signal (sigmix) to determine an adjustment to the clock of the clock unit of the receiver station, the determination based on an analysis of the mixed signal with the receiver signal (esig1) and the receiver signal source signal (sig2) being measured consecutively with at least two different modulation rates; and
adjusting the clock of the clock unit of the receiver station to synchronize the receiver signal source signal (sig2) with the receiver signal (esig1).

21. A method for determining a frequency offset ($\Delta f$) and/or a time offset ($\tau$) of clocks of a transmitter station (SE;SE/EE) and a receiver station (EE;SE/EE) which communicate with each other over an interface (V), the method comprising the steps of:
in the transmitter station (SE;SE/EE), generating a transmitter signal (sig1) with a signal source (SGEN1) and transmitting the transmitter signal over the interface (V), the transmitter signal (sig1) having a first frequency modulation form;
in the receiver station (EE;SE/EE), receiving a receiver signal (esig1) corresponding to the transmitted transmitter signal (sig1) on the interface (V) for evaluating the receiver signal using a receiver signal source signal (sig2) from a receiver-side signal source (SGEN2) matched to the transmitter-side signal source (SGEN1),
the receiver signal source signal (sig2) being triggered by a clock of a clock unit (CLK2) of the receiver station,
the receiver signal source signal (sig2) and the transmitter signal (sig1) being of the same first frequency modulation form;
mixing the receiver signal (esig1) received in the receiver station with the receiver signal source signal (sig2) to form a mixed signal (sigmix); and analyzing the mixed signal (sigmix) to determine the frequency offset ($\Delta f$) and/or the time offset ($\tau$) to the clock of the clock unit of the receiver station, the determination based on an analysis of the mixed signal.

* * * * *